US009167293B2

(12) United States Patent
Hirayama et al.

(10) Patent No.: US 9,167,293 B2
(45) Date of Patent: Oct. 20, 2015

(54) ELECTRONIC DEVICE AND METHOD OF TRANSMITTING CONTENT ITEM

(75) Inventors: Noriyuki Hirayama, Fuchu (JP); Takashi Kokubo, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 125 days.

(21) Appl. No.: 13/292,796

(22) Filed: Nov. 9, 2011

(65) Prior Publication Data

US 2013/0055407 A1 Feb. 28, 2013

(30) Foreign Application Priority Data

Aug. 31, 2011 (JP) .................. 2011-189374

(51) Int. Cl.
*H04N 21/4367* (2011.01)
*H04N 21/4627* (2011.01)
*H04N 21/4408* (2011.01)
*H04N 21/835* (2011.01)

(52) U.S. Cl.
CPC ....... *H04N 21/4367* (2013.01); *H04N 21/4408* (2013.01); *H04N 21/4627* (2013.01); *H04N 21/835* (2013.01)

(58) Field of Classification Search
CPC ............ H04N 21/4367; H04N 21/835; H04N 21/4408; H04N 21/4627; G06F 21/10; G06F 2221/2129
USPC ............... 726/22–34; 380/203, 201; 386/252, 386/253, 257, 259
See application file for complete search history.

(56) References Cited

U.S. PATENT DOCUMENTS

| 7,233,948 | B1 | | 6/2007 | Shamoon et al. |
| 7,904,928 | B2 | * | 3/2011 | Yamaguchi et al. ............ 725/64 |
| 2004/0117663 | A1 | * | 6/2004 | Colvin .......................... 713/202 |
| 2005/0268323 | A1 | * | 12/2005 | Yamaguchi et al. .......... 725/143 |
| 2006/0020786 | A1 | | 1/2006 | Helms et al. |
| 2006/0209745 | A1 | * | 9/2006 | MacMullan et al. .......... 370/328 |

(Continued)

FOREIGN PATENT DOCUMENTS

| EP | 1667146 | 6/2006 |
| JP | 2001-222858 | 8/2001 |

(Continued)

OTHER PUBLICATIONS

NPL: Microsoft, "Windows Digital Audio Protection," Microsoft Corporation. May 12, 2008. 6 pages. (Online version: http://www.microsoft.com/whdc/device/audio/digital-aud_protect.mspx).*

(Continued)

*Primary Examiner* — Chau Le
*Assistant Examiner* — Don Zhao
(74) *Attorney, Agent, or Firm* — Knobbe, Martens, Olson & Bear LLP

(57) ABSTRACT

According to one embodiment, an electronic device includes a content transmitter. The content transmitter is configured to output a content item including first data and second data to one transmission path, by applying a first copyright protection system to copyright protection of the first data and applying a second copyright protection system to copyright protection of the second data. The first copyright protection system involves encryption of data to be copyright-protected. The second copyright protection system involves no encryption of data to be copyright-protected.

4 Claims, 9 Drawing Sheets

(56) References Cited

U.S. PATENT DOCUMENTS

| | | |
|---|---|---|
| 2006/0280440 A1* | 12/2006 | Miyazaki .................. 386/94 |
| 2007/0009232 A1* | 1/2007 | Muraki et al. ............... 386/95 |
| 2007/0094276 A1* | 4/2007 | Isaac ......................... 707/100 |
| 2007/0156603 A1* | 7/2007 | Yoon et al. ................. 705/59 |
| 2008/0288136 A1 | 11/2008 | Itatsu |
| 2009/0263102 A1 | 10/2009 | Shimada et al. |
| 2010/0150529 A1* | 6/2010 | Leichsenring et al. ......... 386/95 |
| 2010/0166017 A1* | 7/2010 | Na et al. .................... 370/474 |
| 2010/0284669 A1 | 11/2010 | Sasaki |
| 2011/0247086 A1* | 10/2011 | Ohno et al. ................. 726/31 |

FOREIGN PATENT DOCUMENTS

| | | |
|---|---|---|
| JP | 2006-025436 | 1/2006 |
| JP | 1 761 052 A2 | 3/2007 |
| JP | 2008-523725 | 7/2008 |
| JP | 2008-287386 | 11/2008 |
| JP | 2009-071786 | 4/2009 |
| WO | WO 03/058376 | 7/2003 |
| WO | WO 2006/063194 A2 | 6/2006 |

OTHER PUBLICATIONS

NPL: Extron Electronics, "HDPA—A Technical Overview," Revision 1.0, Jun. 11, 2009. 7 pages.*

High-bandwidth Digital Content Protection System: Interface Independent Adaptation, Rev. 2.1. Published by Digital Content Protection LLC; Jul. 18, 2011. 72 pages.*

Extended European Search Report dated Feb. 7, 2013 for EP Application No. 11187999.5—1241.

Japanese Office Action dated Jan. 17, 2012 for Japanese Application No. 2011-189374.

European Search Report issued by European Patent Office on Jul. 18, 2013 in the corresponding European Patent Application No. 11 187 999.5-1905.

* cited by examiner

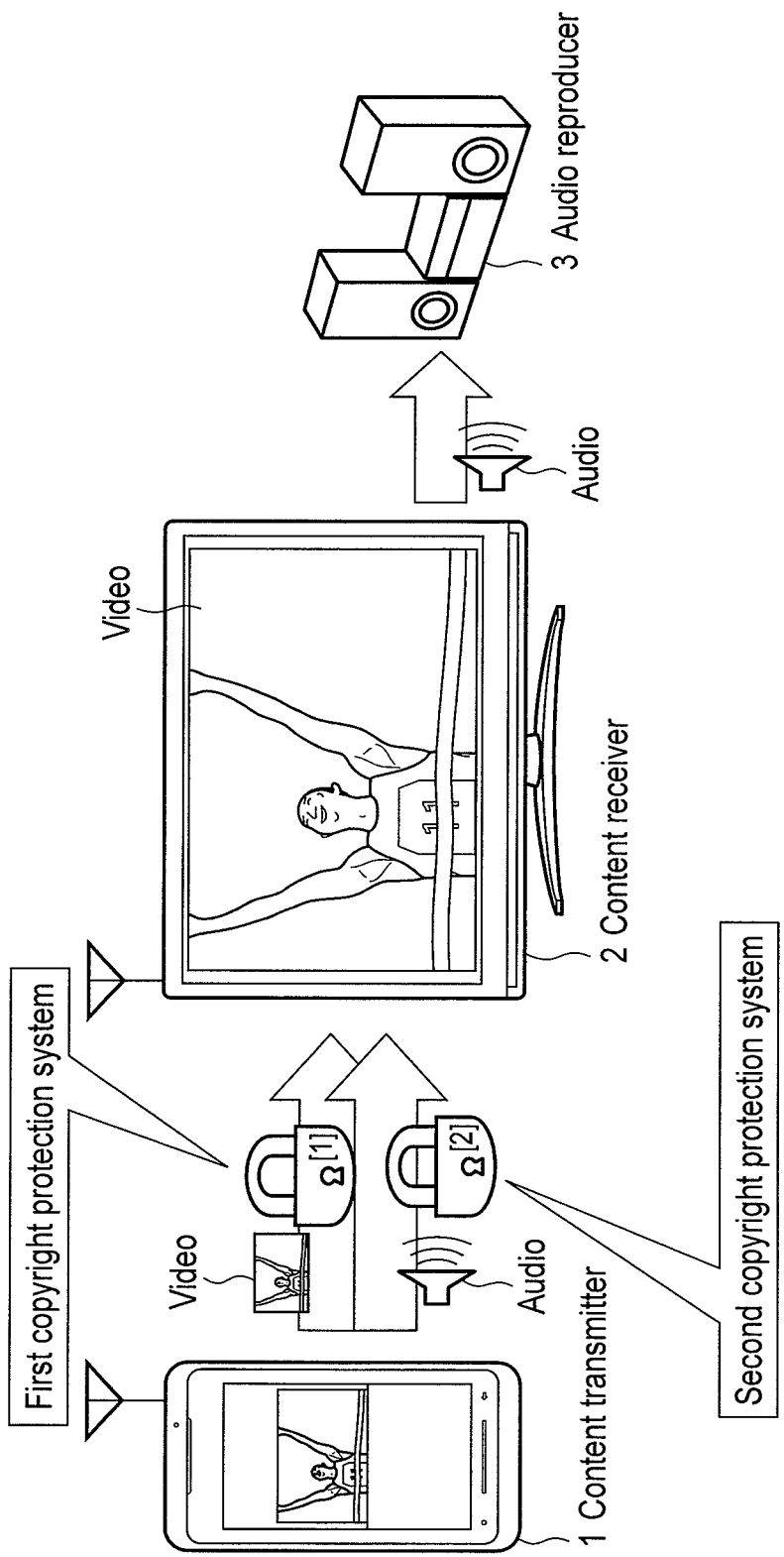
F I G. 1

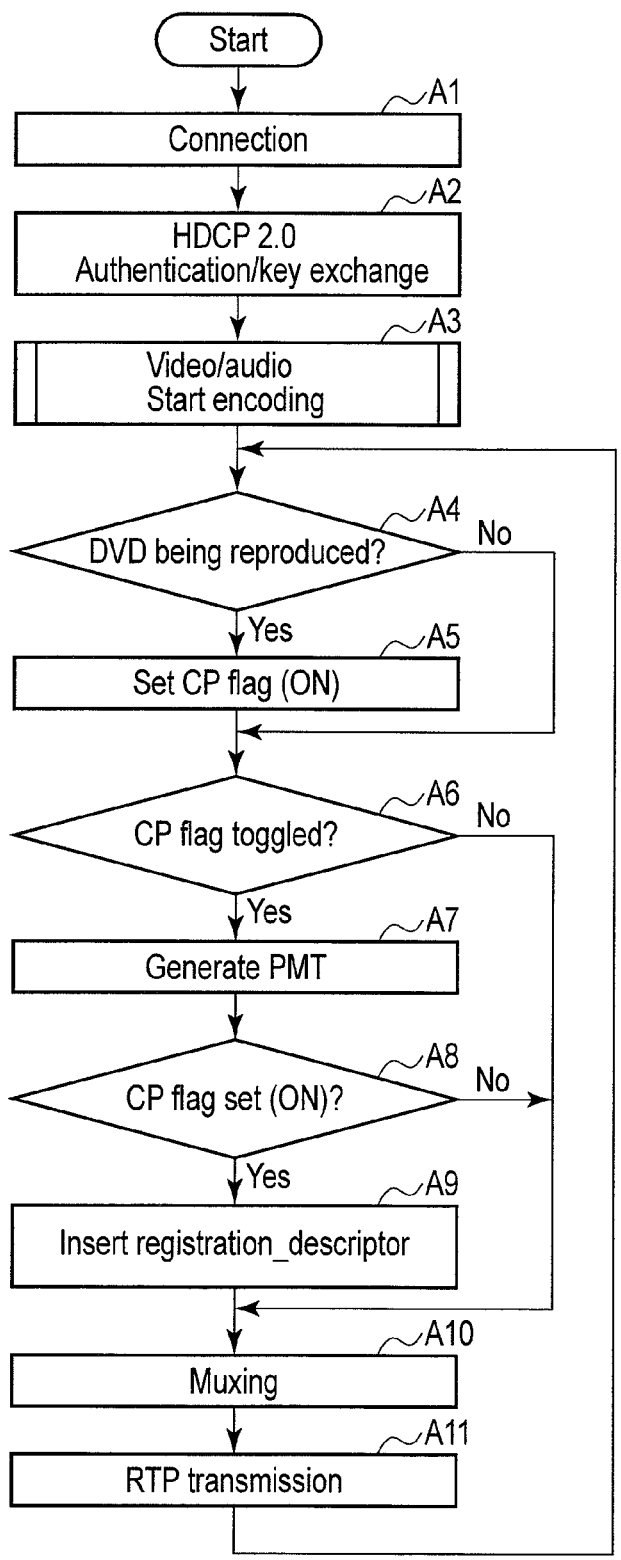
F I G. 2

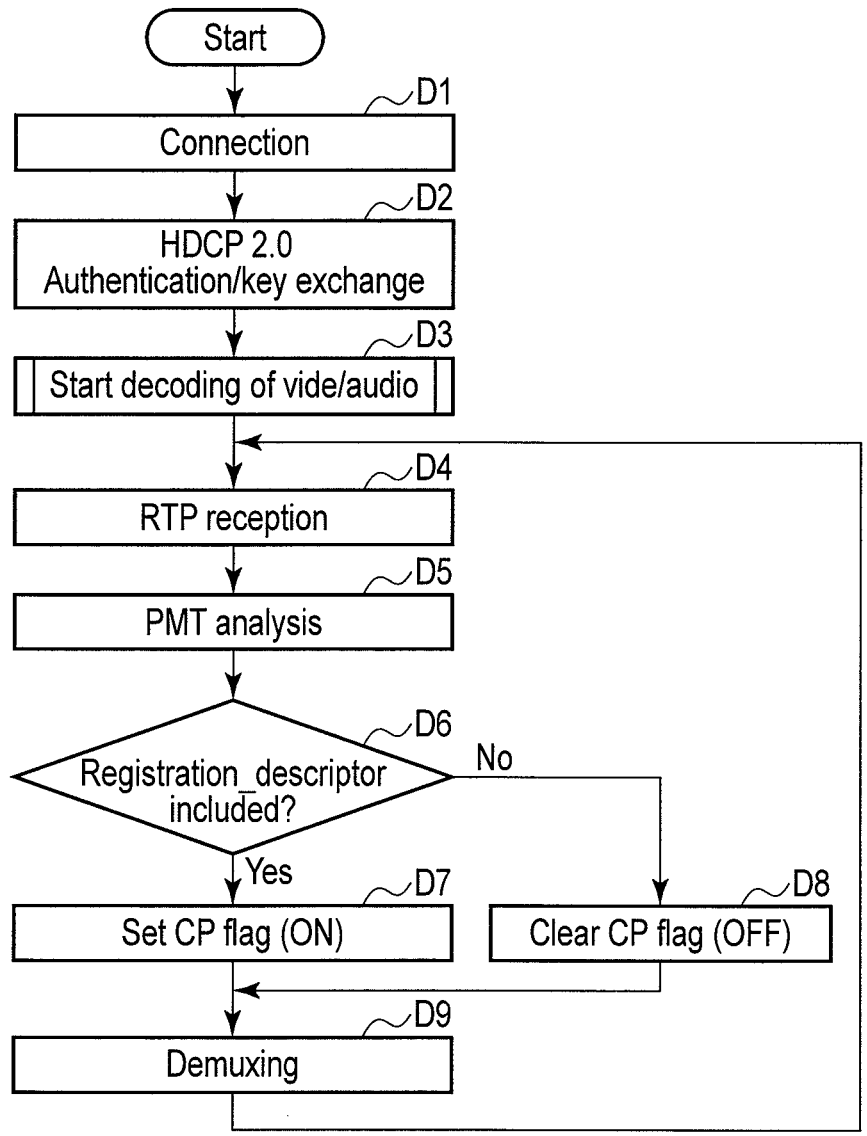
F I G. 5

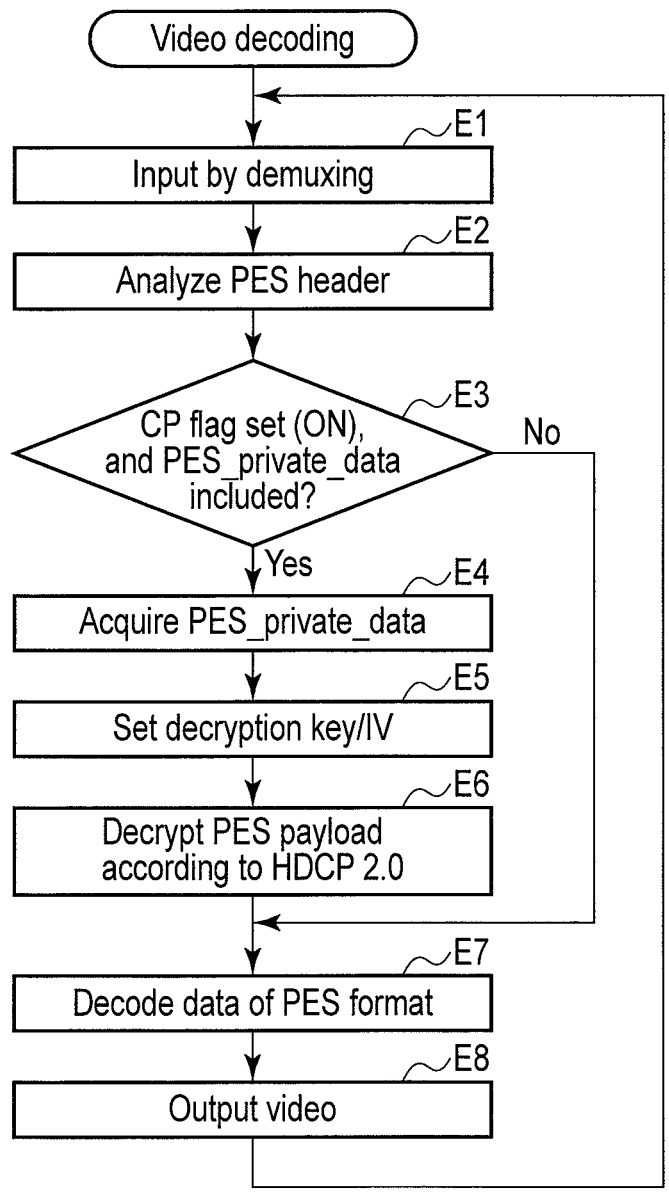
F I G. 6

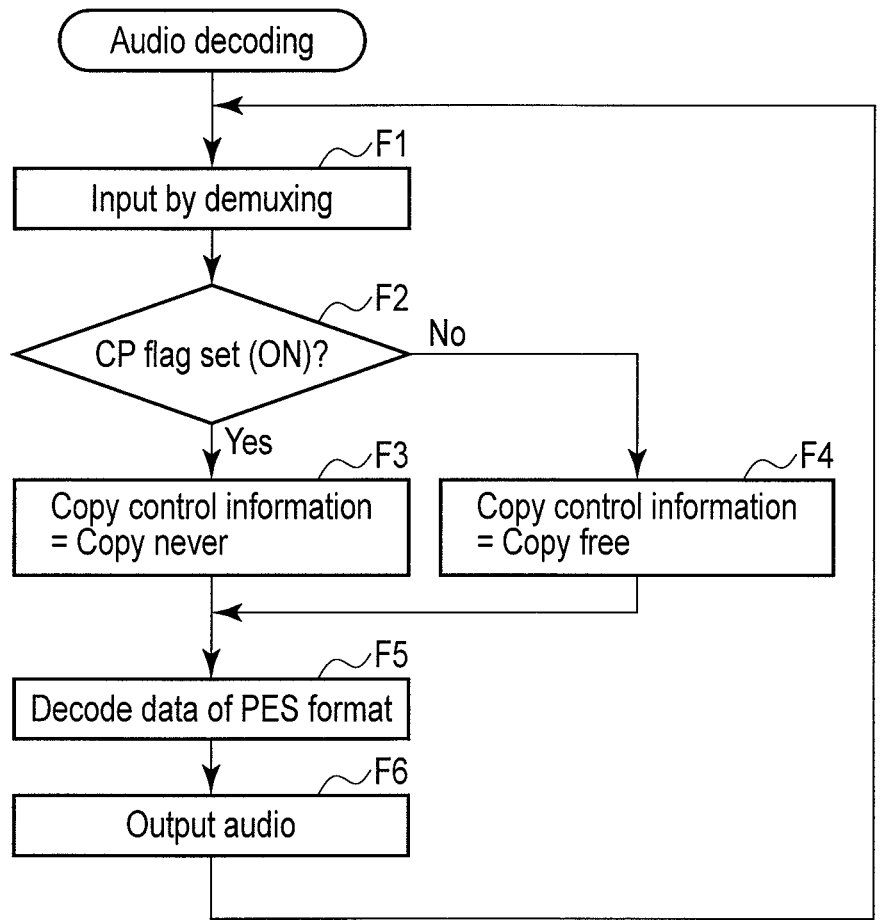
F I G. 7

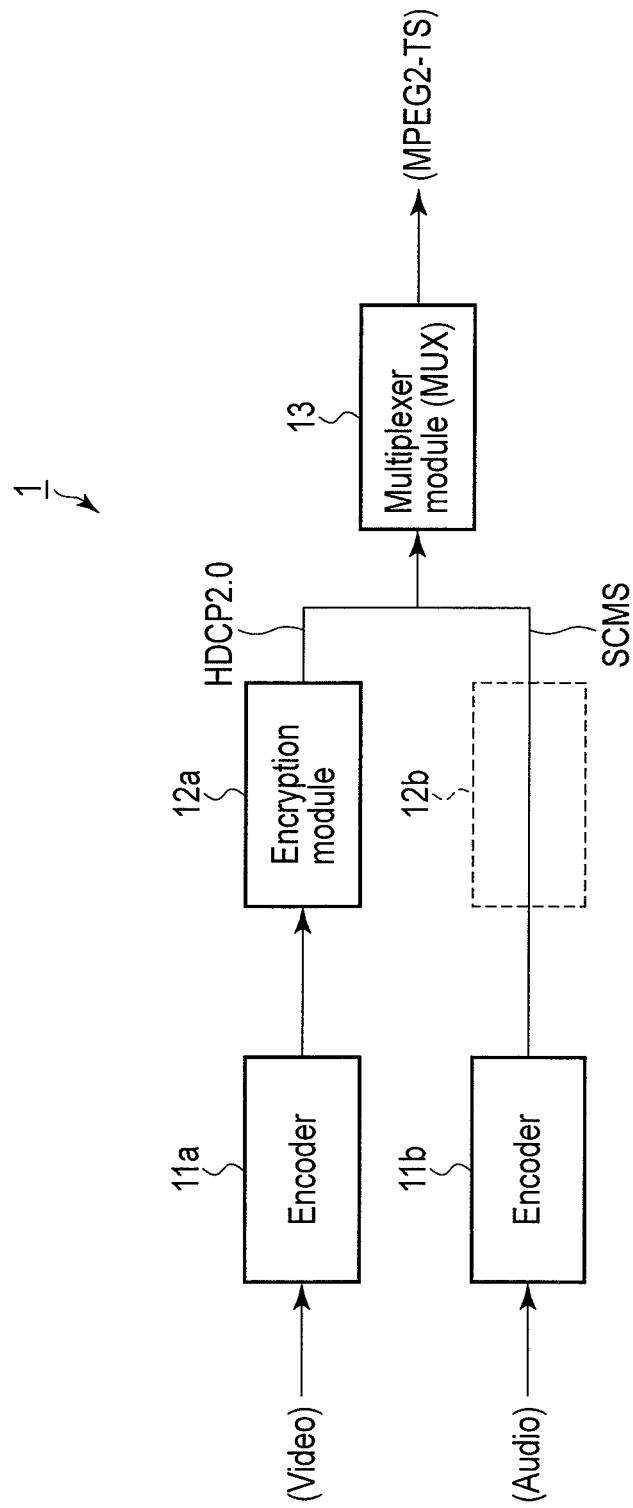
F I G. 8

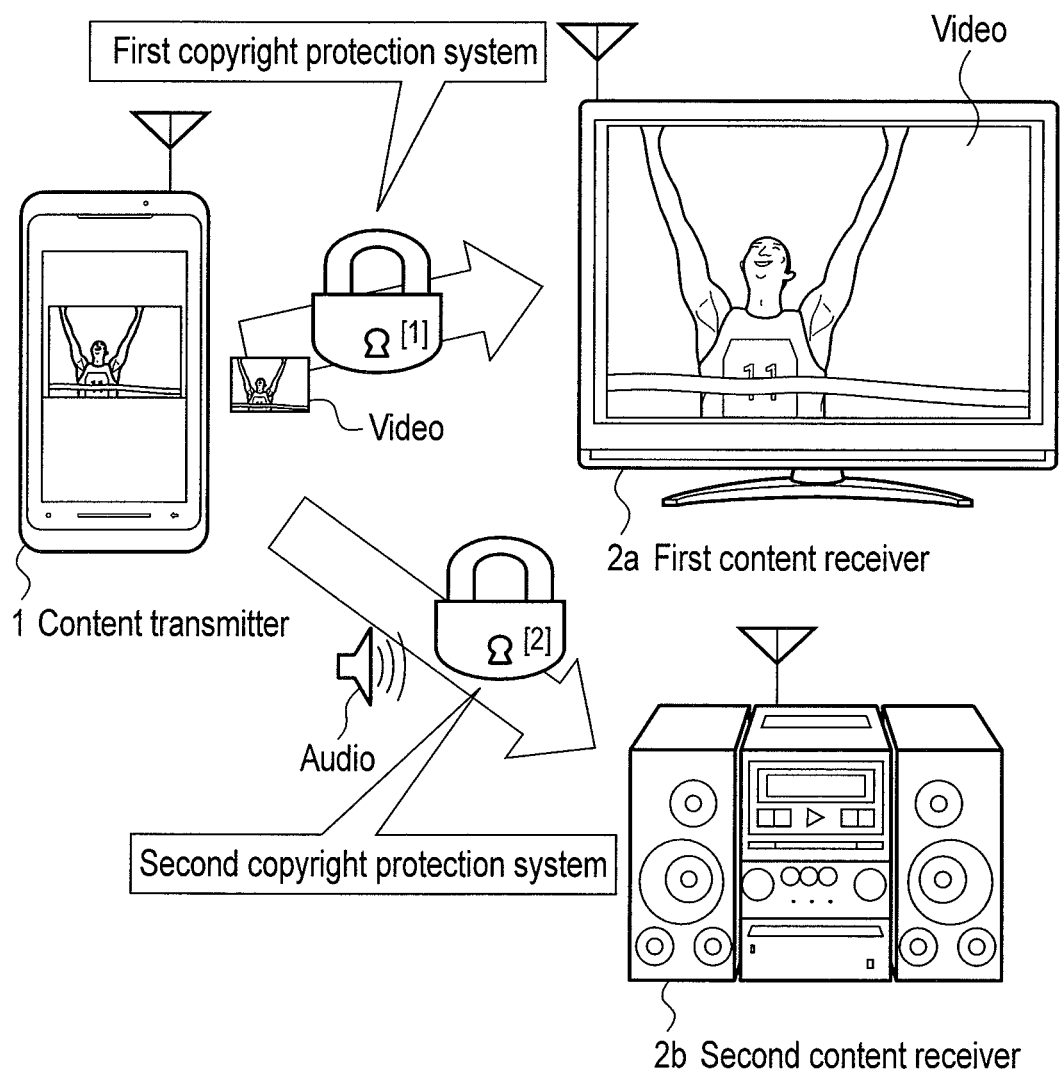
F I G. 9

ELECTRONIC DEVICE AND METHOD OF TRANSMITTING CONTENT ITEM

CROSS-REFERENCE TO RELATED APPLICATIONS

This application is based upon and claims the benefit of priority from prior Japanese Patent Application No. 2011-189374, filed Aug. 31, 2011, the entire contents of which are incorporated herein by reference.

FIELD

Embodiments described herein relate generally to a content transmission technique configured to transmit a content item a copyright of which requires protection through a transmission path such as a local area network (LAN) or the like.

BACKGROUND

In recent years, electronic devices capable of handling a digitalized video or audio such as personal computers and smartphones have become widespread. An electronic device of this type generally incorporates therein a data communication function, and is capable of transmitting/receiving audio-visual (AV) content between itself and other electronic devices.

On the other hand, among the AV content items, there are quite a number of content items the copyright of which requires protection by, for example, limiting duplication. Accordingly, various contrivances configured to transmit/receive AV content items between a plurality of electronic devices while effecting copyright protection have hitherto been proposed.

As a system configured to protect a visual copyright, for example, the high-bandwidth digital content protection system (HDCP) is known. Further, as a system configured to protect an audio copyright, for example, the serial copy management system (SCMS) is known. The HDCP is a system involving encryption of data to be copyright-protected, and the SCMS is a system involving no encryption of data to be copyright-protected. Accordingly, regarding the video and audio included in one AV content item, although the object of copyright protection is common to both of them, a case where they differ from each other in degree of countermeasure to be required as copyright protection, such as a case where encryption is required of one of them, whereas so far as encryption is not required of the other one is conceivable.

Incidentally, heretofore, only one copyright protection system has been adopted to transmit one AV content item to one transmission path, and adopting a plurality of copyright protection systems to transmit one AV content item to one transmission path has not totally been conceived. Accordingly, for example, it has been necessary to subject even the audio of which so far as encryption is not required to encryption to be required of only the video. In such a case, however, in the electronic device on each of both the transmission side and reception side of the AV content, a useless increase in cost resulting from incorporating therein a module (which is originally unnecessary) configured to encrypt/decrypt the audio is brought about.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing a system configuration of a copyright-protected content transmission system according to a first embodiment.

FIG. 2 is an exemplary flowchart showing operation procedures on the content transmitter side of the copyright-protected content transmission system of the first embodiment.

FIG. 5 is an exemplary flowchart showing procedures on the content receiver side of the copyright-protected content transmission system of the first embodiment.

FIG. 6 is an exemplary flowchart showing procedures of video decoding processing to be executed by the content receiver of the copyright-protected content transmission system of the first embodiment.

FIG. 7 is an exemplary flowchart showing procedures of audio decoding processing to be executed by the content receiver of the copyright-protected content transmission system of the first embodiment.

FIG. 8 is an exemplary view showing functional blocks of a transmission function of a content item provided with copyright protection, the transmission function being incorporated in the content transmitter of the copyright-protected content transmission system of the first embodiment.

FIG. 9 is an exemplary view showing a system configuration of a copyright-protected content transmission system according to a second embodiment.

DETAILED DESCRIPTION

Figure 3:
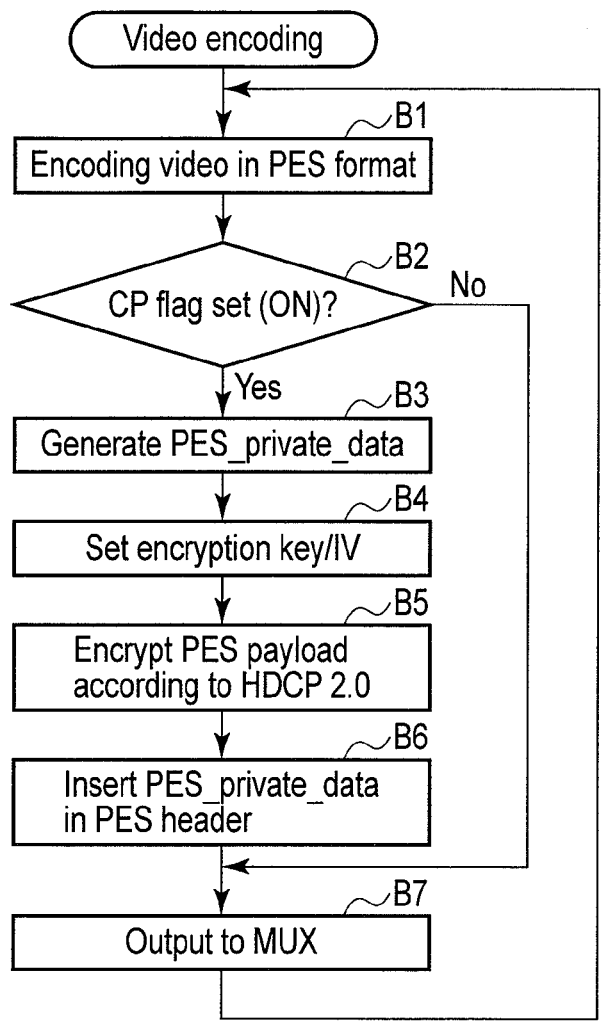
FIG. 3 is an exemplary flowchart showing procedures of video encoding processing to be executed by the content transmitter of the copyright-protected content transmission system of the first embodiment.

Various embodiments will be described hereinafter with reference to the accompanying drawings.

In general, according to one embodiment, an electronic device includes a content transmitter. The content transmitter is configured to output a content item including first data and second data to one transmission path, by applying a first copyright protection system to copyright protection of the first data and applying a second copyright protection system to copyright protection of the second data. The first copyright protection system involves encryption of data to be copyright-protected. The second copyright protection system involves no encryption of data to be copyright-protected.

First Embodiment

First, a first embodiment will be described below.

FIG. 1 is an exemplary view showing a system configuration of a copyright-protected content transmission system according to this embodiment.

As shown in FIG. 1, the copyright-protected content transmission system of this embodiment is constituted of a content transmitter 1, content receiver 2, and audio reproducer 3. It is assumed that the content transmitter 1 and the content receiver 2 are connected to each other by, for example, a wireless LAN (Wi-Fi) of IEEE 802.11, and the content receiver 2 and the audio reproducer 3 are connected to each other by, for example, S/PDIF.

The content transmitter 1 is, for example, a personal computer (PC), encodes the content item (video to be output to a display or the like, and audio to be output to a speaker or the like), and thereafter transmits the encoded content item to the content receiver 2 by Wi-Fi.

The content receiver 2 is, for example, a TV receiver, decodes the (encoded) content item received from the content transmitter 1, and displays the video on a screen. Regarding the audio, it is output, after this decoding, from a speaker incorporated in the content receiver 2 or the audio reproducer 3 via S/PDIF.

The data format of the content item to be transmitted between the content transmitter 1 and content receiver 2 is, for example, the MPEG2-TS format, and the transmission protocol is, for example, the real-time transport protocol (RTP). Further, the copyright-protected content transmission system of this embodiment applies, for example, the high-bandwidth digital content protection system (HDCP) 2.0 or a succeeding standard of the HDCP 2.0 as the copyright protection system (first copyright protection system) configured to protect the video ES, and applies, for example, the serial copy management system (SCMS) as the copyright protection system (second copyright protection system) configured to protect the audio ES. That is, in transmitting one content item through one transmission path, the copyright-protected content transmission system of this embodiment applies a plurality of copyright protection systems to the one content item.

First, with reference to FIG. 2, operations on the content transmitter 1 side among procedures in the copyright-protected content transmission system of this embodiment from transmission of the video and audio to be carried out by the content transmitter 1 to reproduction of the video and audio to be carried out by the content receiver 2 will be described below.

After the power supply of the content transmitter 1 is turned on, when a content transmission application (program) is activated by a user operation, the content transmitter 1 attempts to achieve connection to the content receiver 2 via Wi-Fi. When the connection to the content receiver 2 is established (block A1), the content transmitter 1 executes processing of authentication and key exchange conforming to the HDCP 2.0 between itself and the content receiver 2 (block A2). Thereby, the encryption key for the video ES to be used when the content item provided with copyright protection (content item the copyright of which requires protection) is transmitted, and part ($r_{iv}$) of the initial vector (IV) are determined.

The content transmitter 1 starts encoding of the video to be output to a display or the like, and audio to be output to a speaker or the like (block A3). Regarding details of the encoding processing of the video, and encoding processing of the audio, a description will be given later by using FIG. 4 and FIG. 5. For example, when a content item provided with copyright protection, and written to a DVD is being reproduced by using, for example, a DVD player application or the like (YES in block A4), the content transmitter 1 sets a copy protection (CP) flag as determination of whether or not to require copyright protection (block A5). It should be noted that here the specification stating that the content item to be transmitted should be reproduced by the content transmitter 1, and the reproduced content item should be re-encoded and transmitted to the content receiver 2 is made the premise, and hence although it is determined whether the CP flag is set or clear on the basis of presence/absence of reproduction of the DVD for the sake of simplification, copyright protection information embedded in the DVD itself may also be added to the determination criterion.

Immediately after the activation of the content transmission application, either when the CP flag is cleared or set (YES in block A6), the content transmitter 1 generates a program map table (PMT) describing a PID of each of the video ES and audio ES (block A7) and, further when the CP flag is set (YES in block A8), the content transmitter 1 inserts a registration_descriptor specified by the HDCP 2.0 in the PMT (block A9). The content transmitter 1 inserts an MPEG2-TS packet including the generated PMT in the content data to be transmitted to the content receiver 2. The PMT may also be generated at intervals of a predetermined period such as one second or the like in order to confirm stream information on the content receiver 2 side, and may be inserted in the content data. The PMTs generated by the above operation are of the same data as long as the CP flag is not toggled.

Subsequently, the content transmitter 1 generates content data of the MPEG2-TS format by the multiplexing (MUX) processing by using content data of the PES format generated by video encoding and audio encoding to be described later (block A10), and transmits the generated content data to the content receiver 2 according to the RTP (block A11). While the content transmission application is operated, the content transmitter 1 repeats the above-mentioned operations in sequence.

FIG. 3 is an exemplary flowchart showing procedures of video encoding processing.

The content transmitter 1 first encodes, in the PES format, the video output to the display or the like in accordance with a codec such as the H.264 or the like (block B1).

When the CP flag is set (YES in block B2), the content transmitter 1 determines inputCtr,streamCtr specified by the HDCP 2.0 which is part of the initial vector, and generates PES_private_data specified also by the HDCP 2.0 (block B3). Next, the content transmitter 1 combines the determined inputCtr,streamCtr, and the encryption key and part ($r_{iv}$) of the initial vector generated by the key exchange processing (block A2) with each other to set the encryption key and initial vector (block B4). The content transmitter 1 encrypts the PES payload according to the AES-CTR system employed in the HDCP 2.0 (block B5), and inserts the generated PES_private-_data in the PES header (block B6). Further, the content transmitter 1 outputs the generated video PES to the MUX (block B7). While the content transmission application is operated, the content transmitter 1 repeats the above-mentioned operations in sequence.

Figure 4:
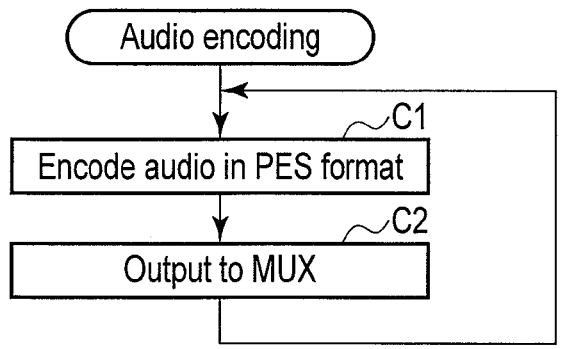
FIG. 4 is an exemplary flowchart showing procedures of audio encoding processing to be executed by the content transmitter of the copyright-protected content transmission system of the first embodiment.

FIG. 4 is an exemplary flowchart showing procedures of audio encoding processing.

The content transmitter 1 first encodes, in the PES format, the audio output to the speaker or the like in accordance with a codec such as the AAC or the like (block C1). The content transmitter 1 outputs the generated audio PES to the MUX (block C2). While the content transmission application is operated, the content transmitter 1 repeats the above-mentioned operations in sequence.

It should be noted that when Wi-Fi connection is carried out in accordance with the WPA system or the like, the part on the transmission path is encrypted although it is not encrypted as the audio PES, and the content data is transmitted. That is, in this case, the whole content data of the MPEG2-TS format including the audio ES is encrypted.

Next, with reference to FIG. 5, operations on the content receiver 2 side among procedures in the copyright-protected content transmission system of this embodiment from transmission of the video and audio to be carried out by the content transmitter 1 to reproduction of the video and audio to be carried out by the content receiver 2 will be described below.

After the power supply of the content receiver 2 is turned on, when switching of the mode to the content transmission mode is carried out by a user operation, the content receiver 2 waits for connection thereto from the content transmitter 1 via Wi-Fi to be carried out. When a connection request from the content transmitter 1 is received, and the connection to the content transmitter 1 is established (block D1), the content receiver 2 executes the processing of authentication and key exchange conforming to the HDCP 2.0 between itself and the content transmitter 1 (block D2). Thereby, the encryption key for the video ES to be used when the content item provided with copyright protection is transmitted, and part ($r_{iv}$) of the initial vector are determined.

The content receiver 2 starts decoding of the video and audio (block D3). Regarding details of the decoding processing of the video, and decoding processing of the audio, a description will be given later by using FIG. 6 and FIG. 7.

The content receiver 2 receives the content data transmitted from the content transmitter 1 according to the RTP (block D4), and analyzes the PMT (block D5). When a registration_descriptor is included in the PMT (YES in block D6), the content receiver 2 sets the CP flag (block D7) and, on the other hand, when a registration_descriptor is not included in the PMT (NO in block D6), the content receiver 2 clears the CP flag (block D8). The content receiver 2 subjects the MPEG2-TS packet to filtering by using stream information obtained by analyzing the PMT to thereby DEMUX (separate) the video ES, and audio ES from the content data (block D9). While the content item is transmitted from the content transmitter 1, the content receiver 2 repeats the above-mentioned operations in sequence.

FIG. 6 is an exemplary flowchart showing procedures of video decoding processing.

When the video ES is input by the above DEMUX operation (block E1), the content receiver 2 analyzes the PES header (block E2). When the CP flag is set, and a PES_private_data is included therein (YES in block E3), the content receiver 2 acquires the PES_private_data (block E4), and combines the inputCtr,StreamCtr extracted from the PES_private_data, a decryption key for the video ES generated by the key exchange processing, and part ($r_{iv}$) of the initial vector with each other to set the decryption key and initial vector (block E5). Further, the content receiver 2 decrypts the encrypted PES payload according to the AES-CTR system employed in the HDCP 2.0 (block E6).

Subsequently, the content receiver 2 decodes the content data of the PES format (block E7), and outputs the video to the display or the like (block E8). While the content item is transmitted from the content transmitter 1, the content receiver 2 repeats the above-mentioned operations in sequence.

FIG. 7 is an exemplary flowchart showing procedures of audio decoding processing.

When the audio ES is input by the DEMUX operation (block F1), if the CP flag is set (YES in block F2), the content receiver 2 sets "copy never" as copy control information of the SCMS (block F3) and, on the other hand, if the CP flag is clear (NO in block F2), the content receiver 2 sets "copy free" as copy control information of the SCMS (block F4). That is, in the copyright-protected content transmission system of this embodiment, the registration_descriptor (configured to notify whether or not to require copyright protection of the video) specified by the HDCP 2.0 which is the first copyright protection system to be applied to copyright protection of the video is utilized also as information configured to notify whether or not to require copyright protection of the audio to which the SCMS that is the second copyright protection system is applied.

Subsequently, the content receiver 2 decodes the content data of the PES format (block F5), and outputs the decoded content data to the audio reproducer 3 together with the set copy control information (block F6). While the content item is transmitted from the content transmitter 1, the content receiver 2 repeats the above-mentioned operations in sequence.

The audio reproducer 3 outputs the audio data received from the content receiver 2 to the speaker or the like, and further carries out copy control of the audio in accordance with the copy control information received from the content receiver 2.

As described above, the copyright-protected content transmission system of this embodiment applies a plurality of copyright protection systems to one content item. As has been exemplified in the above description, when the HDCP 2.0 is applied to copyright protection of the video, and the SCMS is applied to copyright protection of the audio, it is possible on the content transmitter 1 side to make a module (12b) configured to encrypt/decrypt the audio unnecessary as shown in FIG. 8 under the condition that encryption of the video is required. Likewise, on the content receiver 2 side too, it is possible to make a module configured to encrypt/decrypt the audio unnecessary. That is, the copyright-protected content transmission system of this embodiment realizes the transmission function of the content item provided with copyright protection at a low cost.

It should be noted that in the above description, although an example in which presence/absence of the registration_descriptor specified by the HDCP 2.0 (to be applied to the video) is utilized as copy control of the audio (applying the SCMS) has been shown, copy control information may be notified from the content transmitter 1 to the content receiver 2 by communication based on the real time streaming protocol (RTSP) or the like either when the CP flag is cleared immediately after the content transmission application is started on the content transmitter 1 side or when the CP flag is set. The content receiver 2 switches copy control information to be output to the audio reproducer 3 in accordance with the received copy control information.

Further, here, although the copy control information is treated as only one of "copy never" and "copy free", a case where "copy once" is handled is conceivable depending on the content item to be reproduced on the content transmitter 1 side.

Second Embodiment

Next, a second embodiment will be described below.

FIG. 9 is an exemplary view showing a system configuration of a copyright-protected content transmission system according to this embodiment.

The second embodiment differs from the first embodiment in that the video and audio are transmitted from a content transmitter 1 to different transmission destination devices separate from each other. As shown in FIG. 9, in the copyright-protected content transmission system of this embodiment, the content transmitter 1 transmits the video to a first content receiver 2a, and transmits the audio to a second content receiver 2b. The first content receiver 2a is, like the first embodiment, for example, a TV receiver, and the second content receiver 2b is, for example, an AV amplifier.

Operations of the content transmitter 1 of this embodiment are basically identical to the operations of the content transmitter 1 of the first embodiment. However, the operations of the content transmitter 1 of this embodiment differ from those of the first embodiment in the following points.

(a) that connection is established respectively between itself and the first content receiver 2a, and between itself and the second content receiver 2b (b) that authentication/key-exchange processing of the HDCP 2.0 is unnecessary between itself and the second content receiver 2b (c) that each content data item to be transmitted to the first content receiver 2a, and each content data item to be transmitted to the second content receiver 2b is generated in the MPEG2-TS format, only the video ES is included, as the ES, in the content data to be transmitted to the first content receiver 2a, and only the audio ES is included, as the ES, in the content data to be transmitted to the second content receiver 2b Further, operations of each of the first content receiver 2a, and second content receiver 2b of this embodiment are basically identical to the operations of the content receiver 2 of the first embodiment. However, the operations of the first content receiver 2a, and second content receiver 2b of this embodiment differ from those of the content receiver 2 of the first embodiment in that the first content receiver 2a outputs only the video, and the second content receiver 2b outputs only the audio.

Figure 10:
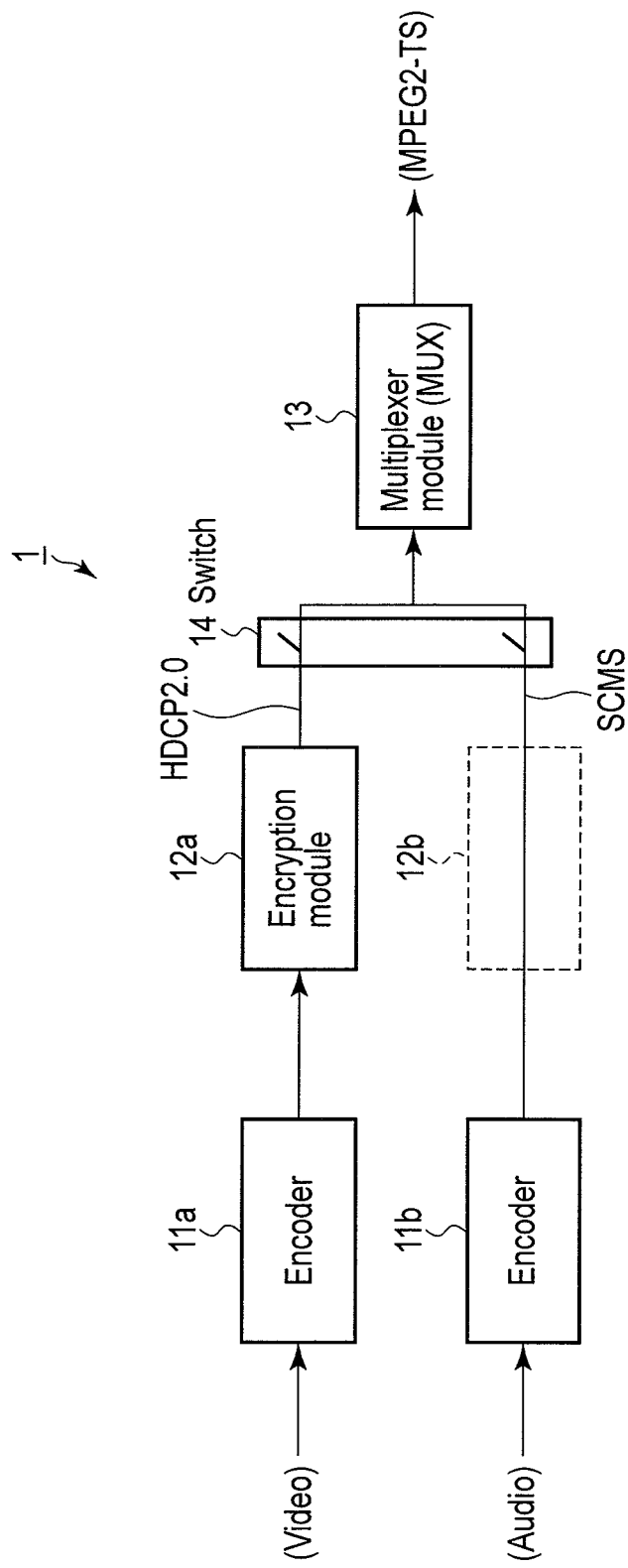
FIG. 10 is an exemplary view showing functional blocks of a transmission function of a content item provided with copyright protection, the transmission function being incorporated in a content transmitter of the copyright-protected content transmission system of the second embodiment.

In the copyright-protected content transmission system of this embodiment in which the transmission destination of the video and audio transmitted from the content transmitter 1 is separated into the first content receiver 2a and second content receiver 2b, too, it is possible, on the content transmitter 1 side, to make a module (12b) configured to encrypt/decrypt the audio unnecessary as shown in FIG. 10 by applying a plurality of copyright protection systems to one content item. It is possible to generate content data including only the video ES as the ES, and content data including only the audio ES as the ES by providing, for example, a switch 14 configured to selectively supply one of the video and audio to a multiplexer module (MUX) 13. The switch 14 may also be configured in such a manner that the switch 14 can be derive-controlled to supply both the video and audio to the multiplexer module (MUX) 13.

Further, it is also possible, on the first content receiver 2a side, to make a module configured to encrypt/decrypt the audio unnecessary. Furthermore, it is possible; on the second content receiver 2b side, to eliminate the existence itself of the module for encryption/decryption. That is, the copyright-protected content transmission system of this embodiment also realizes the transmission function of the content item provided with copyright protection at a low cost.

Notification of copy control information about the audio from the content transmitter 1 to the second content receiver 2b may be carried out by including the registration_descriptor in the PMT of the content data to be transmitted from the content transmitter 1 to the second content receiver 2b or may be carried out by communication based on the RTSP or the like.

In the case where the registration_descriptor is included in the PMT, the second content receiver 2b sets the CP flag when the registration_descriptor is included in the PMT, and clears the CP flag when the registration_descriptor is not included in the PMT. When the audio ES is input by the DEMUX operation, the second content receiver 2b sets "copy never" as copy control information of the SCMS if the CP flag is set, and sets "copy free" as copy control information of the SCMS if the CP flag is clear.

On the other hand, in the case of communication based on the RTSP or the like, the second content receiver 2b switches the copy control in accordance with copy control information received from the content transmitter 1.

It should be noted that here an example in which the content transmitter 1 transmits content data including only the video ES as the ES to the first content receiver 2a, and transmits content data including only the audio ES as the ES to the second content receiver 2b has been shown. However, the example is not limited to this, and the same content data including both the video ES and the audio ES as the ES may be transmitted to both the first content receiver 2a and second content receiver 2b in a multicasting manner. That is, each of the first content receiver 2a, and second content receiver 2b may eclectically select ESs. In any event, the content transmitter 1 transmits the video ES and audio ES from one communication module such as a Wi-Fi module or the like to the outside.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device configured to transmit a content item comprising video data and audio data, the device comprising:
   a video encoder configured to encode video data to generate a video packetized elementary stream (PES);
   an encryptor configured to encrypt the video PES encoded by the video encoder, by using an encryption system complying with an HDCP standard;
   an audio encoder configured to encode audio data to generate an audio PES;
   a multiplexer configured to generate multiplexed data complying with an MPEG-2 TS format, the multiplexed data comprising the video PES encrypted by the encryptor and the audio PES not subjected to encryption complying with the HDCP standard, the multiplexer being configured to insert a registration descriptor specified by the HDCP standard in a program map table (PMT) in the multiplexed data when copyright protection is required for the video PES and the audio PES, the registration descriptor indicating that the video PES is encrypted by using an encryption system complying with the HDCP standard and not indicating that the audio PES is to be protected in accordance with the HDCP standard; and
   a content transmitter configured to output, by using an RTP protocol, the multiplexed data generated by the multiplexer to an external device via a wireless transmission path, wherein:

the external device prohibits copying of both the video PES encrypted in accordance with the HDCP standard and the audio PES not subjected to encryption complying with the HDCP standard if the registration descriptor is inserted in the PMT in the multiplexed data, the registration descriptor indicating that the video PES is encrypted by using the encryption system complying with the HDCP standard and not indicating that the audio PES is to be protected in accordance with the HDCP standard; and the external device permits copying of the audio PES not subjected to encryption complying with the HDCP standard if the registration descriptor is not inserted in the PMT in the multiplexed data.

2. An electronic device configured to receive a content item comprising video data and audio data, the device comprising:

a content receiver configured to receive, by using an RTP protocol, multiplexed data complying with an MPEG-2 TS format from a wireless transmission path, the multiplexed data comprising a video PES encrypted by using an encryption system complying with an HDCP standard and an audio PES not subjected to encryption complying with the HDCP standard; and a processor configured to:

prohibit copying of the audio PES not subjected to encryption complying with the HDCP standard in the multiplexed data if a registration descriptor specified by the HDCP standard is inserted in a program map table (PMT) in the multiplexed data, the registration descriptor indicating that the video PES is encrypted by using the encryption system complying with the HDCP standard and not indicating that the audio PES is to be protected in accordance with the HDCP standard; and permit copying of the audio PES not subjected to encryption complying with the HDCP standard if the registration descriptor is not inserted in the PMT in the multiplexed data.

3. A method of transmitting a content item for an electronic device which transmits the content item comprising video data and audio data, the method comprising:

encoding video data to generate a video PES;

encrypting the video PES, by using an encryption system complying with an HDCP standard;

encoding audio data to generate an audio PES;

generating multiplexed data complying with an MPEG-2 TS format, the multiplexed data comprising the encrypted video PES and the audio PES not subjected to encryption complying with the HDCP standard, the generating comprising inserting a registration descriptor specified by the HDCP standard in a program map table (PMT) in the multiplexed data when copyright protection is required for the video PES and the audio PES, the registration descriptor indicating that the video PES is encrypted by using an encryption system complying with the HDCP standard and not indicating that the audio PES is to be protected in accordance with the HDCP standard; and outputting, by using an RTP protocol, the multiplexed data to an external device via a wireless transmission path, wherein:

the external device prohibits copying of both the video PES encrypted in accordance with the HDCP standard and the audio PES not subjected to encryption complying with the HDCP standard if the registration descriptor is inserted in the PMT in the multiplexed data, the registration descriptor indicating that the video PES is encrypted by using the encryption system complying with the HDCP standard and not indicating that the audio PES is to be protected in accordance with the HDCP standard; and the external device permits copying of the audio PES not subjected to encryption complying with the HDCP standard if the registration descriptor is not inserted in the PMT in the multiplexed data.

4. A method of receiving, by an electronic device, a content item comprising video data and audio data, the method comprising:

receiving by a content receiver, by using an RTP protocol, multiplexed data complying with an MPEG-2 TS format from a wireless transmission path, the multiplexed data comprising a video PES encrypted by using an encryption system complying with an HDCP standard and an audio PES not subjected to encryption complying with the HDCP standard;

prohibiting, by a processor, copying of the audio PES not subjected to encryption complying with the HDCP standard in the multiplexed data when a registration descriptor specified by the HDCP standard is inserted in a program map table (PMT) in the multiplexed data, the registration descriptor indicating that the video PES is encrypted by using the encryption system complying with the HDCP standard and not indicating that the audio PES is to be protected in accordance with the HDCP standard; and permitting copying of the audio PES not subjected to encryption complying with the HDCP standard if the registration descriptor is not inserted in the PMT in the multiplexed data.

* * * * *